United States Patent [19]

Moreau

[11] 3,918,172

[45] Nov. 11, 1975

[54] METHOD AND APPARATUS FOR DETERMINING GEODESIC MEASUREMENTS BY HELICOPTER

[75] Inventor: Richard Moreau, Laval, Canada

[73] Assignee: Hydro-Quebec, Montreal, Canada

[22] Filed: Dec. 26, 1973

[21] Appl. No.: 428,043

[52] U.S. Cl. .................. 356/4; 356/1; 356/138; 356/152; 356/154; 350/172; 350/299
[51] Int. Cl.$^2$.. G01C 3/08; G01B 11/26; G02B 5/08
[58] Field of Search ............... 356/1, 4, 5, 141, 152, 356/138, 154, 172; 350/172, 299

[56] References Cited
UNITED STATES PATENTS

| | | | |
|---|---|---|---|
| 3,472,574 | 10/1969 | Kuhn | 350/287 |
| 3,528,747 | 9/1970 | Walsh | 356/154 |
| 3,709,607 | 1/1973 | McConnell et al. | 356/152 |
| 3,804,525 | 4/1974 | Caudill | 356/141 |

FOREIGN PATENTS OR APPLICATIONS 854,266   8/1952   Germany .............................. 33/1 T OTHER PUBLICATIONS
"Geodolite" Brochure, Spectra-Physics, 3–1968.

*Primary Examiner*—Maynard R. Wilbur
*Assistant Examiner*—S. C. Buczinski

[57] ABSTRACT

The present invention concerns a method for determining the geographical characteristics of a number of points of a terrain, and to an apparatus particularly adapted to carry out this method. The system comprises a laser beam transmitter placed on ground at a point to be defined, which beam is detected by means of an airborne device constituted of convergent or divergent lens and mirrors disposed so as to permit the pilot of a helicopter to visualize the beam. This system permits the accurate positioning of the helicopter above the point to be defined. The different angles and distances are obtained by means of instruments, such as a tellurometer and a theodolite placed at a known point of the terrain. However, to obtain the differences in level between the helicopter and the point to be defined, a transmitter-receiver of infrared beams capable of transmitting through a mirror a vertical beam which is reflected by a reflecting plate mounted under the helicopter is provided.

15 Claims, 6 Drawing Figures

METHOD AND APPARATUS FOR DETERMINING GEODESIC MEASUREMENTS BY HELICOPTER

The present invention relates to a method for determining the geographical characteristics of a number of points of a terrain, and to an apparatus particularly adapted to carry out this method.

Topographic maps are usually drawn up from photographic pictures taken from an aircraft. But, to draw the map from the picture, it is necessary to know the geographical characteristics of a certain number of points on the ground, for use as references.

Surveying has historically been carried out by surveyors using levels and rods for determining the altitude of a point while the horizontal position was obtained by means of surveying chains and transits.

Not so long ago, the use of towers have allowed to decrease the number of aimings required, linear measurements being obtained by means of tellurometers and vertical angles for altitudes through the use of a theodolite. The introduction of the helicopter as a sighting target, being indeed a substitute to the top of the tower, had allowed up till now to determine sufficiently accurately the height of a point to be determined. But, the distance measurements were inadequate because of errors occuring from inaccurate means provided for keeping the helicopter exactly at the vertical of the point to be determined. Indeed, the quasi permanent swing of a hovering helicopter has a minor influence on its height, while it has a great influence on an horizontal distance to be measured. It becomes therefore imperative to device an accurate system which could "fix" the helicopter exactly at the vertical of such point.

Many systems have been proposed to permit to the pilot of a helicopter to position the latter at the vertical of a ground point.

A first system consists of a series of mirrors located in the pilot's compartment of the helicopter which allow the pilot to visualize a ground point. This system is relatively simple and sufficiently accurate for several applications. However, its accurancy (3-4 feet) is not satisfactory for the measurement of horizontal distances intended for large scale mapping (1:5000 or more). This is caused, on the one hand, by the small pendulum-like movements of the system, the hovering never being perfectly stationary, thereby producing a continuous oscillation of the helicopter. On the other hand, any disarrangement of the system may go unnoticed and produce important errors. At all events, with this arrangement the error proportionally grows with the height of the helicopter.

Another system proposes the use of a suspended TV camera such as described in U.S. Pat. No. 3,523,660 delivered on Aug. 11, 1970 (ATTEBERY et. al.). This system suffers from the same disadvantages as the preceding one (oscillation, and so on) and is furthermore affected by the wind, the system being mounted outside the helicopter.

A third system described for instance in U.S. Pat. No. 3,709,607 of Jan. 9, 1973, advocates the use of a vertically oriented laser beam. The beam from the laser is detected by means of a series of photoelectric cells forming two concentric circles. The measurements are made when the beam crosses the periphery of the inside circle. It seems that there is nevertheless some possibilities of ambiguity, as when the beam only lightly touches the inside circle without actually entering it, a measure will be taken while the helicopter is not properly centered. A suspended TV camera is also used to permit the pilot to manoeuvre the helicopter over the point to be determined.

There is also a system called "AIRMARK" used by Associated Helicopters of Edmonton, Canada, wherein a TV camera is installed on the ground. By transmitting to the pilot the picture taken from beneath the helicopter, the pilot is able to accurately position the helicopter vertically over the point. The advantage of the laser system resides in its simplicity and the rather low cost of the apparatus used.

A prime object of the present invention consists in providing a system which permits a great accuracy in the positioning of a helicopter over a point on the ground and which is not cumbersome. The system in accordance with the invention comprises a laser beam transmitter placed on ground at the point to be defined and a detector for detecting said beam by means of an airborne device constituted of refringent elements and mirrors so disposed as to permit the pilot to visualize the beam. The advantage of the present system with respect to standard systems is its great simplicity and the much lower cost of the material used As to the measurements of vertical distances, two methods are known. One consists of using a plumb-bob over a graduated station mark. This method although very simple is in practice limited to altitudes of 250–300 feet, higher the plumb-bob string being too curved even under the intensity of a light wind, so that it becomes almost impossible to have the plumb-bob to fall exactly on the point mark. Another method, however, allows measurements at high altitude: it comprises a TV system suspended in the inside of the pilot's compartment and used for approximately centralizing the helicopter over the point and a measuring instrument, directed towards the nadir, for measuring altitudes. By using a reflecting panel on ground, it is possible to measure altitudes up to 700 feet.

A further object of the present invention relates to the determination of vertical distances which are as and even more accurate than those obtained through known apparatus, but substantially less expensive. This is achieved through the use of an infrared transmitter-receiver on ground and coupled with a reflector mounted under the helicopter.

Other advantages and characteristics of the present invention will become more evident through the following description of a preferred embodiment given with reference to the drawings, wherein FIG. 1 is a schematic view of a system for obtaining geodesic measurements by means of a helicopter, in accordance with the present invention;

FIG. 2 schematically illustrates the relative position of a laser beam detector mounted on a helicopter as well as the helicopter pilot;

Figure 1:
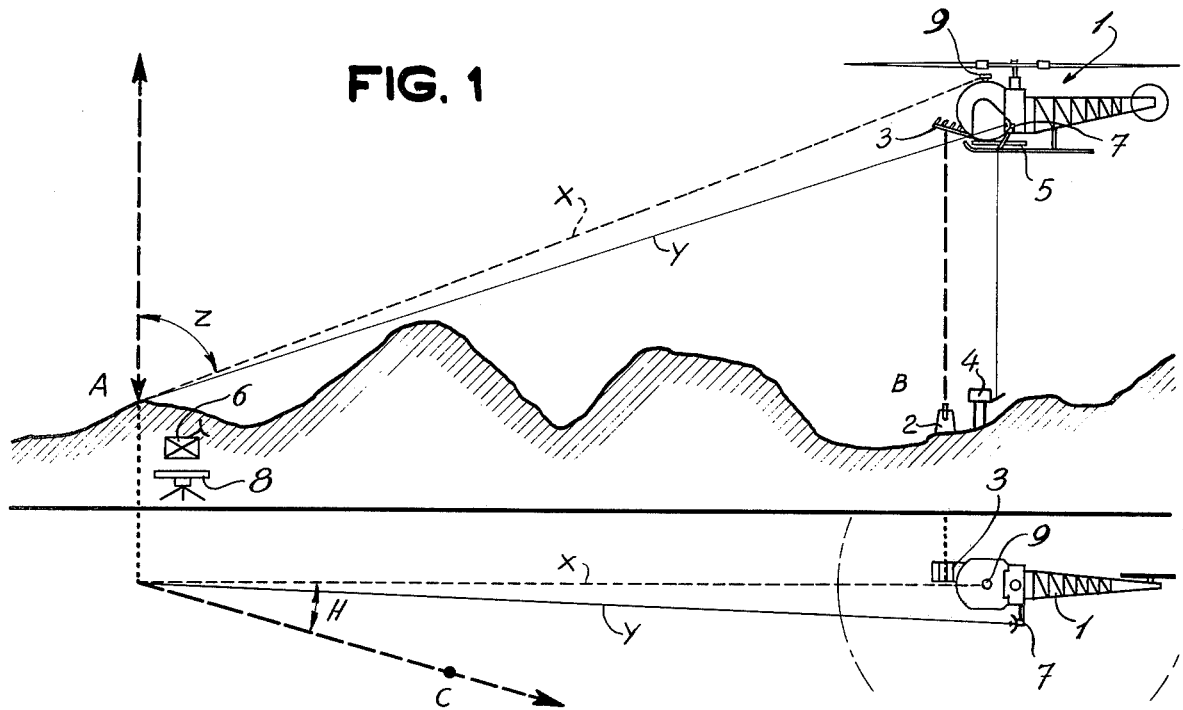

FIG. 1 illustrates schematically the relative arrangement of apparatus and instruments susceptible to carry out a method of surveying in accordance with the present invention. A helicopter 1 of known type is maintained stationary over a point "B", the geographical position of which in connection with a known point "A" is desired. In order to fix the helicopter substantially vertically over the point B, a light source 2 able to produce a monochromatic ray beam, such as a laser beam transmitter, is mounted at point B and the beam vertically directed over this point. This beam is viewed by the pilot of the helicopter through a detector 3 mounted at the front end of the helicopter and located at the pilot's feet.

Figure 2:
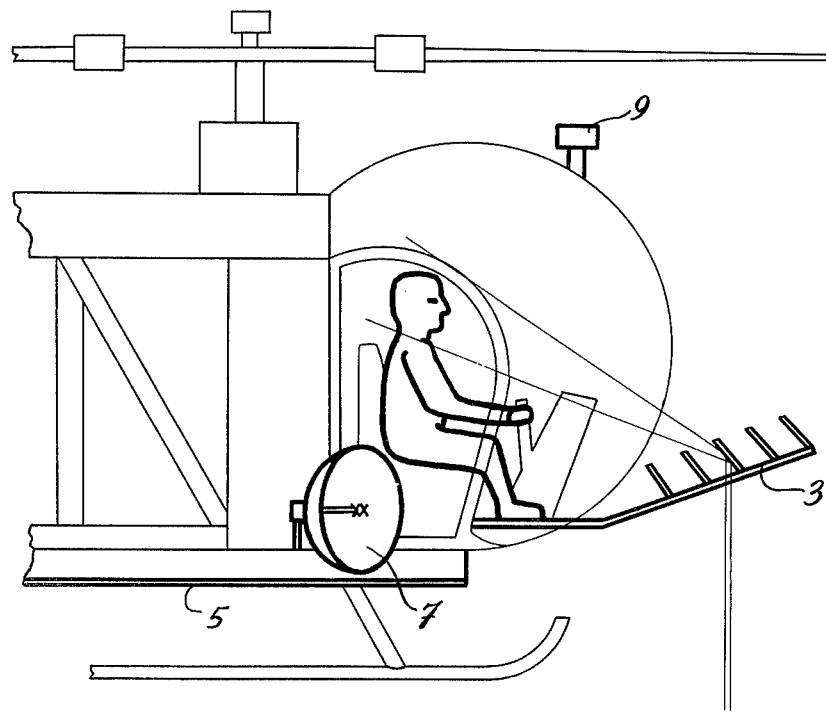

The relative positioning of the detector 3 and the pilot is by way of example, illustrated at FIG. 2 wherein there is shown a particular conception of the detector 3 which permits to the pilot to visualize the light beam at the moment the beam reaches the detector 3. It is to be noted that the main part of the detector 3 may be inclined at a predetermined angle with respect to the horizontal in connection to the type of helicopter used and is chosen so as not to interfere with the aerodynamic characteristics of this helicopter. This angle is usually of about 20°.

When the helicopter is well fixed over the station, B, the distance from the base station A and the helicopter is measured by means of a microwave apparaus 6 coupled to one or more pivotally mounted parabolic antennas 7 preferably mounted on the helicopter sides. This measuring apparatus 6 may, for instance, be a tellurometer of the MRB201 type produced by Plessey Electronics Corporation, New York. A surveying instrument 8 such as a thedolite, set at the base station A, is provided for measuring the angles "Z" and "H", Z being the angle between the vertical direction and a direction determined by a strobelite 9 mounted on the helicopter and H being determined by the direction of this strobelite 9 and a known point "C". To obtain the differences in level between the helicopter and station B, an infrared ray transmitter-receiver 4 is juxtaposed to the laser 2 and transmits by means of a mirror a vertical beam which is reflected by a reflecting plate 5 mounted under the helicopter. The height is obtained by merely reading the indicated data on the transmitter-receiver 4. The reflecting plate 5 consists of a series of retroreflectors made of plastic material which reflect a beam in a direction substantially parallel to the incidence beam. The plate covered with these reflectors may be of about 4 by 4 feet. In certain applications, a reflector constituted of high quality cataphotes is added to measure large distances.

It is to be noted that the helicopter pilot as well as the technical teams continuously communicate one with the other by means of very high frequency transmitter-receiver radios.

Figure 3:
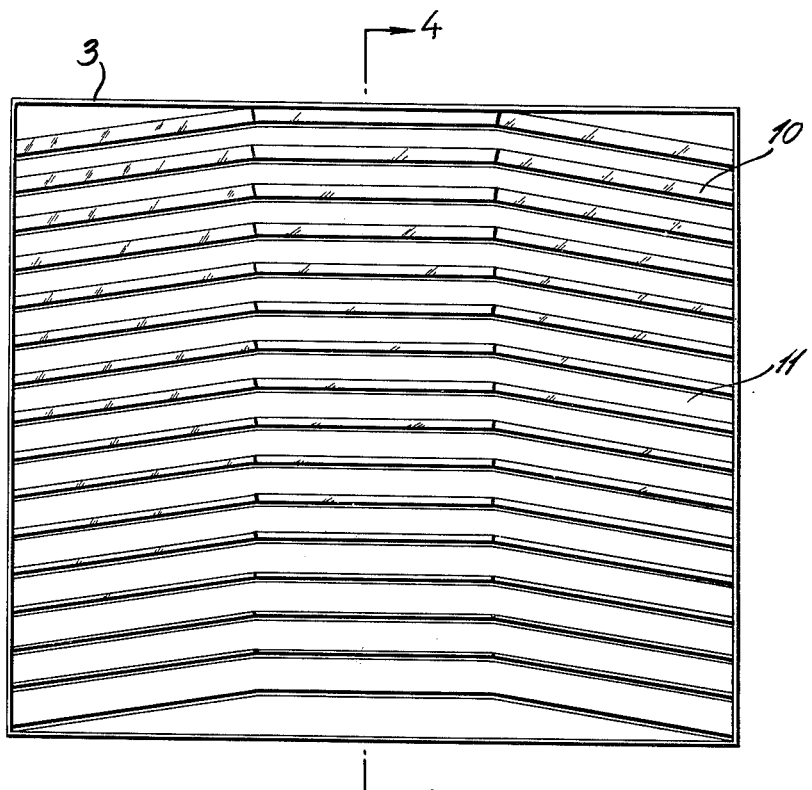
FIGS. 3, 4 and 4a show details of the laser beam detector in accordance with the present invention.
Figure 4A:
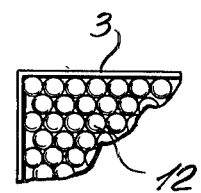
Figure 4:
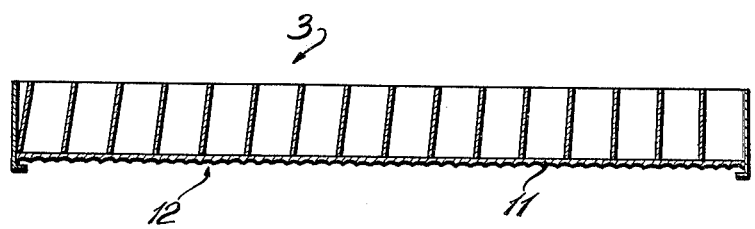

FIGS. 3, 4 and 4a illustrate a preferred embodiment of the laser beam detector 3. This detector 3 is constituted of a series of mirrors 10 set in parallel and slightly tilted so that the laser beam be reflected towards the pilot's eyes (FIG. 2). The pilot therefore sees through the transparent part of the helicopter compartment the detector 3 as a whole. Preferably, each of the mirrors 10 has a length of 8 inches and a width of 3 inches. The group of mirrors comprises a central section and two lateral sections, each of the lateral sections preferably making an angle of about 10° with a corresponding mirror of the central section. A spacing of about 1.5 inches between any two adjacent mirrors has been proven suitable. Of course, a group of concave mirrors may as well be used.

As illustrated in FIG. 4, the mirrors may be tilted so that the laser beam be always reflected towards the pilot's eyes. The angle of tilting of the mirrors is governed by the position of the pilot's eye with respect to the detector and gradually varies preferably from 10° at the front to 1° at the rear; this angle may also vary following the type of helicopter used.

A honeycomb-like plate 11 is set under the mirrors 10. Preferably, this plate 11 is made up of a transparent acrylic panel, the respective sides of which are of approximately 2 feet. The lower surface of the plate 11 is substantially covered by honeycombs 12 the spherical curvature of which is chosen so that the incident laser beam is sufficiently spread to form a light cone of a diameter of about 2 feet at the pilot's eyes. Without these honeycombs which are in fact dispersing lens or converging lens of small focal length, the laser beam would have a diameter of about 1 inch when reaching the pilot's eyes, then slight movements of the helicopter or of the pilot's head would sweep the beam on both sides of the pilot's eyes, so that the pilot would never be able to detect such beam. Owing to these lens, the pilot is able to visualize the laser beam as long as the latter reaches the plate 11, then he is able to correct the helicopter yaws through the apparent shifting of the fixed laser beam on the detector 3.

Therefore, as long as the pilot sees the laser beam, the helicopter is at about 1 foot vertically positioned over the point to be determined. Thus, when the light beam is detected, the pilot notifies by radio the teams on ground that the required measurements be effected or to stop them as soon as he ceases to detect such beam.

As seen, all measurements are made on ground, which means a reduction of weight on the helocopter, the pilot being alone, thereby making easier the positioning of the same.

Figure 5:
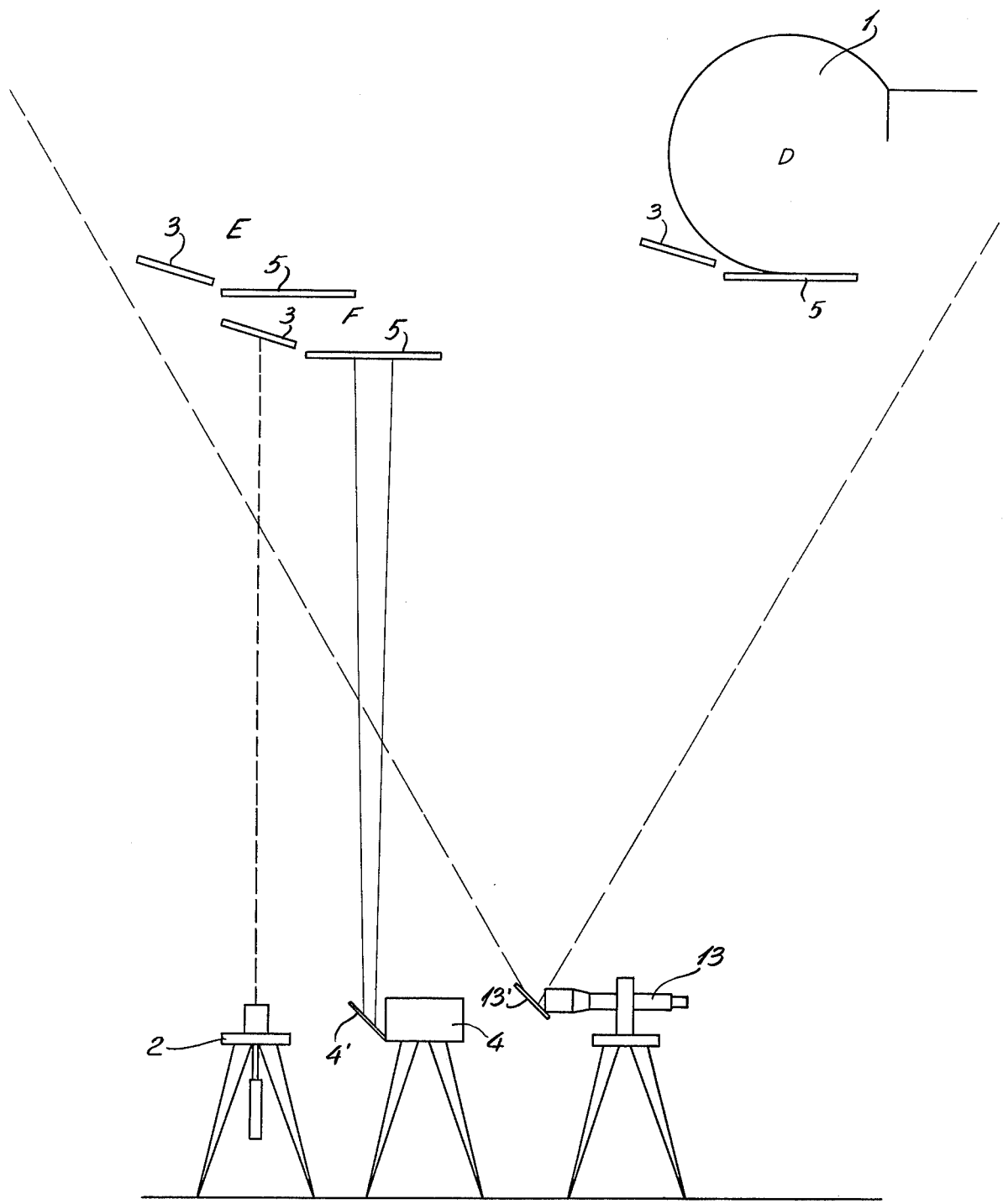
FIG. 5 represents a method for centrallizing the helicopter over a point the geodesic characteristics of which are to be determined.

FIG. 5 illustrates a method for positioning the helicopter at the vertical above the point to be defined. Thus, the helicopter rises to the desired altitude and the pilot directs the same towards the point. To facilitate the approach of the helicopter over this point, a telescope 13 provided with a mirror 13' is used. Then, when the pilot reaches the position "D" he is detected through the telescope 13 and led, by radio means, until the reflection of the beam from the laser emitter 2 on the plate 5 is detected. The helicopter is then in position "E". By successive approximations, the pilot is guided until the beam is reflected at about the detector 3. At which time the pilot backwardly manoeuvres the helicopter so that the beam crosses the detector 3 as in position "F". From then, the beam being spred by the detector 3 and reflected towards the pilot's eyes, the latter can, while the measurements are taken, control by himself the position of the helicopter.

It is to be noted that the laser transmitter 2 axis does not always coincide with the axis of rotation of the base plate, so the latter has to be turned by 180° at half way of the measuring period, and consequently the positioning of the helicopter has to be resumed, if necessary. So it is if the instruments become out of level by more than one division.

Therefore, the great advantages of the airborne system described above reside in the speediness with which the required measurements are performed and the possibility in wooded areas to reduce drastically the number of towers to be built or the deforestation necessary for obtaining the relative horizontal measurements as well as the differences in level between two far and not intervisible points. For instance, if within a radius of 30 miles the horizontal positions of about 10 points are required, only those points used as base stations (four required) have to be either cleared or provided with a tower. Consequently, with the system in accordance with the invention, preparations only take 4/14 or about one-third of the time and of the cost compared with standard systems.

All the data obtained are computerized and permit to define accurately the characteristics of a desired point Each measurement is performed several times and averages; then, the vertical angle, the distance and the height of the helicopter permit by trigonometry to obtain the horizontal distance and the altitude of the point to be determined. The horizontal angle situates this point with respect to the other points of the terrain.

Experiments have proven that the accuracy obtained by means of the system in accordance with this invention is more than adequate and may even in very hilly and wooded areas go beyond that accuracy obtained through standard means. Through the present method of fixing the helicopter by means of a laser beam, it is possible to measure a distance of 10 miles within an accuracy of 1 foot.

I claim:

1. A system for determining the geographical position of a point located at a remote station from a reference point at a base station, comprising
   a helicopter at said remote station;
   a light source capable of producing a beam of monochromatic rays, said beam being vertically directed towards the helicopter;
   a transparent plate having angularly disposed on one surface thereof a plurality of parallel reflecting means, said plate being mounted at the front end of the helicopter so as to permit the helicopter pilot to directly visualize said light beam striking the transparent plate and being then reflected by the parallel reflecting means towards the pilot, thereby indicating that the helicopter is substantially vertically positioned over said remote point;
   instrument means at the base station and on the helicopter for taking angle and distance measurements.

2. System as claimed in claim 1, wherein said light source is a laser beam transmitter.

3. System as claimed in claim 1, wherein the distance between the helicopter and the remote point is determined by means of an infrared ray transmitter-receiver set at said remote station, a reflector being mounted under the helicopter for reflecting the infrared rays.

4. System as claimed in claim 1, wherein the distance between the helicopter and the reference point is determined by means of a microwave device set at said base station, said device being coupled with a parabolic antenna mounted on the helicopter.

5. System as claimed in claim 1, wherein angles are measured by means of a theodolite provided at the base station and coupled to a strobelite mounted on the helicopter.

6. System as claimed in claim 1, wherein the surface opposite to said one surface of said transparent plate includes a plurality of lens embedded therein.

7. System as claimed in claim 6, wherein each of said lens has a concave surface.

8. System as claimed in claim 6, wherein each of said lens has a convex surface and a small focal length.

9. System as claimed in claim 1, wherein said parallel reflecting means are mirrors and are divided into three groups, each of the groups including a predetermined number of parellel mirrors and each of the mirrors of a given group being angularly set with respect to a mirror of an adjacent group.

10. A light beam detector, comprising
    a panel made of transparent plastic material, said panel having refringent elements on one surface thereof, the other surface being substantially flat; and
    reflecting means mounted on and at an angle to said flat surface of the transparent panel, said reflecting means being divided into three distinct groups, each of said groups including a predetermined number of parallel reflecting means each of which standing at a given angle to a reflecting means of an adjacent group, thereby reflecting in a predetermined direction the light beam diffused through said refringent elements.

11. A detector as claimed in claim 10, characterized in that each of said refringent elements has a concave surface, said elements covering substantially said one surface of the panel.

12. A detector as claimed in claim 10, characterized in that each of said refringent elements has a convex surface and a small focal length, said elements covering substantially said one surface of the panel.

13. A detector as claimed in claim 10, characterized in that said given angle is approximately of 10°, and that the angle between one of said reflecting means and a perpendicular drawn from said flat surface of the panel varies from 1° to 10°.

14. A light beam detector, comprising
    a panel made of transparent plastic material, said panel having refringent elements on one surface thereof, the other surface of said panel being flat; and
    a plurality of concave reflecting means mounted on and at an angle to said flat surface of the transparent panel so as to reflect in a predetermined direction the light beam diffused through said refringent elements.

15. A detector as claimed in claim 14, characterized in that each of said parallely mounted reflecting means makes an angle with a perpendicular drawn from said flat surface of the panel varying between 1° and 10°.

* * * * *